United States Patent [19]

Blount

[11] 4,325,859

[45] Apr. 20, 1982

[54] PROCESS FOR THE PRODUCTION OF ORGANIC POLYMER POLYOL-ALKALI METAL SILICATE EMULSION

[76] Inventor: David H. Blount, 5450 Lea St., San Diego, Calif. 92105

[21] Appl. No.: 284,597

[22] Filed: Jul. 20, 1981

Related U.S. Application Data

[63] Continuation-in-part of Ser. No. 191,375, Sep. 29, 1980, Pat. No. 4,282,129, which is a continuation-in-part of Ser. No. 146,474, May 5, 1980, Pat. No. 4,273,908.

[51] Int. Cl.³ .............................................. C08L 83/02
[52] U.S. Cl. ...................................... 524/96; 521/122; 521/134; 521/138; 521/139; 521/140; 521/154; 525/165; 525/171; 524/249; 524/251; 524/253; 524/321; 524/287; 524/377; 524/501; 524/507; 524/442

[58] Field of Search ................. 260/29.6 NR, 29.6 F, 260/29.7 NR, 22 CB; 521/122, 154, 139; 525/165, 171

[56] References Cited

U.S. PATENT DOCUMENTS 4,282,129  9/1981  Blount ................................ 521/154

Primary Examiner—Morton Foelak

[57] ABSTRACT

A stable organic polymer-polyol-alkali metal silicate emulsion is produced by mixing an aqueous solution of an alkali metal silicate or alkali metal metasilicate pentahydrate, a liquid polyol, an organic polymer in a fluid state, and a small amount of an acid while heating the mixture to 40° C. to 100° C. and agitating until the mixture emulsifies. The emulsion may be used to produce organic polymer-polyurethane silicate foams and resinous product.

13 Claims, No Drawings

PROCESS FOR THE PRODUCTION OF ORGANIC POLYMER POLYOL-ALKALI METAL SILICATE EMULSION

CROSS-REFERENCE TO RELATED APPLICATIONS

This application is a continuation-in-part of my copending U.S. patent application, No. 191,375, filed Sept. 29, 1980, now U.S. Pat. No. 4,282,129 issued Aug. 4, 1981, which is a continuation-in-part of my copending U.S. Pat. application, Ser. No. 146,474, filed May 5, 1980 now U.S. Pat No. 4,273,908 issue June 16, 1981.

BACKGROUND OF THE INVENTION

This invention relates to a process for the production of a stable liquid organic polymer-polyol-alkali metal siicate emulsion by mixing an aqueous solution of an alkali metal silicate or alkali metal metasilicate pentahydrate, an organic polymer in a fluid state, a liquid polyol and a small amount of an acid, preferably an organic acid, while heating to 40° C. to 100° C. and agitating the mixture until it emulsifies.

An unstable organic polymer-polyol-alkali metal silicate emulsion can be produced by mixing the organic polymer in a fluid state, the liquid polyol and alkali metal silicate while heating and agitating, but the result is unstable and within a few hours, the alkali metal silicate settles to the bottom. The mixture must be re-heated in order to get the alkali metal silicate into an emulsion with the polyol. I have discovered that a stable emulsion of organic polymers in a fluid state, liquid polyol and alkali metal silicate can be produced by adding 1% to 5% by weight, percentage based on the alkali metal silicate, of an acid, preferably a polycarboxyl compound. These emulsions are stable for months, then when some alkali metal silicate settles out, it is easily re-emulsified by agitating.

A stable liquid polyol-alkali metal silicate emulsion is produced by emulsifying the following components:
Component (a): a liquid alkali metal silicate,
Component (b): a liquid polyol,
Component (c): an organic acid,
Component (d): an organic polymer in a fluid state.

Component (a)

Any suitable alkali metal silicate may be used in this invention such as sodium, potassium and lithium silicates. The alkali metal silicates are preferred to be in an aqueous solution which contains 40% to 70% alkali metal silicate or an alkali metal metasilicate pentahydrate which melts to form a liquid at a temperature below 100° C. When a solution of sodium silicate, commonly known as "water glass", is used, it is necessary to add an alkali metal hydroxide in the amount up to 10% by weight, percentage based on "water glass", to avoid coagulation of the alkali metal silicate when added to the polyol. Any suitable alkali metal hydroxide such as sodium hydroxide, potassium hydroxide and mixtures thereof may be used for this purpose.

When the organic polymer is in an aqueous medium, the alkali metal silicate may be in a solid form which is soluble in water. The use of powdered or granulated forms of alkali metal silicate reduced the percentage of water present in the emulsion.

Component (b)

Any suitable liquid polyol (organic polyhydroxyl compound), in particular, compounds which contain from 2 to 8 hydroxyl groups, especially those with a molecular weight of about 400 to about 6,000, e.g., polyesters, polyethers, polythioethers, polyacetals, polycarbonates or polyester amides containing at least 2, generally 2 to 8, but preferably dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated. Examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, andomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterephthalate and bisglycol terephthalate. Any suitable polyhydric alcohol may be used such as, for example, ethylene glycol; propylene-1,2- and -1,3-glycol; butylene-1,4- and -2,3-glycol; propylene-1,2- and -1,2-glycol; bytylene-1,4- and -2,3-glycol; hexane-1,6-diol; octand-1,8-diol; neopentyl glycol; cyclohexanedimethenol-1(1,4-bis-hydroxymethylcyclohexane); 2-methylpropane-1,3-diol; glycerol; trimethylol propane; pentaerythritol; quinitol; mannitol and sorbitol; methyl glycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, such as ε-caprolactone, or hydroxycarboxylic acid such as ω-hydroxycaproic acid, may also be used.

The polyethers with at least 2, generally from 2 to 8 and preferably 2 or 3, hydroxyl groups used according to the invention are known and may be prepared, e.g., by the polymerization of epoxides, e.g., ethylene oxide, propylene oxide, butylene oxide, tetrahydrofuran oxide, styrene oxide or epichlorohydrin, each with itself, e.g., in the presence of $BF_3$, or by addition of these epoxides, optionally as mixtures or successively, to starting components which contain reactive hydrogen atoms such as alcohols or amines, e.g., water, ethylene glycol; propylene-1,3- or -1,2-glycol; trimethylol propane; 4,4-dihyroxydiphenylpropane; aniline; ammonia; ethanolamine or ethylenediamine; sucrose polyethers such as those described, e.g., in German Auslegeschriften Nos. 1,175,358 and 1,064,938, may also be used according to the invention. It is frequently preferred to use polyethers which contain predominantly primary OH groups (up to 90% by weight, based on the total OH groups contained in the polyether). Polyethers modified with vinyl polymers such as those which may be obtained by polymerizing styrene or acrylonitrites in the presence of polyethers (U.S. Pat. Nos. 3,383,351; 3,304,273; 3,523,093 and 3,110,695; and German Pat.

No. 1,152,536) and polybutadienes which contain OH groups are also suitable.

By "polythioethers" are meant, in particular, the condensation of thiodiglycol with itself and/or with other glycols, dicarboxylic acids, formaldehyde, aminocarboxylic acids or amino alcohols. The products obtained are polythio-mixed ethers or polythioether ester amides, depending on the co-component.

The polyacetals used may be, for example, the compounds which may be obtained from glycols, 4,4'-dihyroxydiphenylmethylmethane, hexanediol, and formaldehyde. Polyacetals suitable for the invention may also be prepared by the polymerization of cyclic acetals.

The polycarbonates with hydroxyl groups used may be of the kind, e.g., which may be prepared by reaction diols, e.g., propane-1,3-diol; butane-1,4-diol; and/or hexane-1,6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides, any polyvalent saturated and unsaturated amino alcohols, diamines, polyamines and mixtures thereof.

Polyhydroxyl compounds which contain urethane or urea groups, modified or unmodified natural polyols, e.g., castor oil, carbohydrates and starches, may also be used. Additional products of alkylene oxides with phenol formaldehyde resins or with ureaformaldehyde resins are also suitable for the purpose of the invention.

Examples of these compounds which are to be used according to the invention have been described in High Polymers, Volume XVI, "Polyurethane, Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199; and in Kunststoff-Handbuch, Volume VII, Vieweg-Hochtlen, Carl-Hanser-Verlag, Munich, 1966, on pages 45 to 71.

Any suitable organic compound which has at least 2 hydrogen atoms that will react with isocyanate compounds may be used with the polyol in an amount up to 50% of the polyol.

Component (c)

Any suitable organic acid may be used in this invention, such as aliphatic carboxylic acids, aliphatic acid anhydrides, aliphatic polycarboxylic acids, cycloaliphatic carboxylic acids, cycloaliphatic polycarboxylic acids, aromatic carboxylic acid, aromatic polycarboxylic acids, heterocyclic polycarboxylic acids, aliphatic carboxylic acid anhydrides, aromatic carboxylic acid anhydrides and mixtures thereof. The organic acids may be substituted, e.g., with halogen atoms and may be unsaturated.

Organic polycarboxylic acids are preferred. Adipic acid is the preferred polycarboxylic acid. It is preferred to use the organic mono-carboxylic acids with polycarboxylic acids.

Examples of suitable aliphatic acids are, but are not limited to, acetic acid propionic acid, formic acid, butyric acid, valeric acid, caproic acid, undecanoic acid, lauric acid, palmitic acid, stearic acid, etc.

An example of suitable aliphatic acid anhydrides is acetic anhydride, but examples are not limited to that.

Examples of suitable aromatic acids are, but are not limited to, benzoic acid, para-aminobenzoic acid, salicylic acid, methyl salicylate, etc.

The polycarboxylic acid may be aliphatic, cycloaliphatic, aromatic and/or heterocyclic and may be substituted, e.g., with halogen atoms and may be unsaturated; examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterephthalate and bis-glycol terephthalate.

Component (d)

Any suitable organic polymer in a fluid state may be used in this invention. It is preferable that the organic polymer be in the form of an aqueous emulsion or suspension. The polymerized unsaturated organic compound, such as vinyl compound, organic dienes, allyl compound or unsaturated fluorocarbon compounds, and mixtures thereof, may be used in this invention. An aqueous emulsion or suspension of polystyrene is the preferred organic polymer. The organic polymers in organic solvents, found in solutions, emulsions or suspensions, may also be used.

Suitable polyvinyl polymers in an aqueous suspension or emulsion include, but are not limited to, polystyrene, polyacrylate, alkali metal polyacrylate, polyvinyl acetate, polyvinyl chloride, polyvinylidine chloride, polyacrylonitrile, polyvinyl toluenes, poly(N-vinyl carbazole), polyvinyl pyrovidone, polyvinylidene cyanide, poly(alkyl vinyl ketones), poly(aryl vinyl ketones), poly(methacrylonitrile) and mixtures thereof.

Suitable poly(organic dienes) polymers in an aqueous suspension or emulsion include, but are not limited to, polyisoprene, polychloroprene, polybutadiene, and mixtures thereof.

Suitable poly(allyl compounds) in an aqueous emulsion include poly(allyl alcohol), poly(methallyl alcohol), poly(phenallyl alcohol), poly(allyl chloride), poly(3-bromopropane), poly(methallyl chloride) and mixtures thereof.

Suitable unsaturated fluorocarbon polymers in an aqueous emulsion or suspension include polytetrafluoroethylene, polyhexafluoropropylene, polychlorotrifluorothylene and mixtures thereof.

Suitable organic copolymers of vinyl monomers, organic dienes, allyl compounds, unsaturated fluorocarbon compounds and mixtures thereof, in an aqueous suspension or emulsion, may be used in this invention.

The stable organic polymer-polyol-alkali metal silicate emulsion is useful in the production of polyurethane silicate resinous and foamed products. The organic polymer-polyol-alkali metal silicate emulsion may be used in the polyurethane foaming machines which are made to handle a filler in the polyol component, usually called Component B. The organic polymer-polyol-alkali metal silicate emulsion, optionally containing an amine catalyst, an organo-metallic compound blowing agent and surface-active agent, is mixed with a polyisocyanate or isocyanate-terminated polyurethane prepolymer and is allowed to react, thereby producing a polyurethane silicate resinous or foamed product. The polyurethane silicate foam and resinous products have many uses, such as for thermal and sound insulation, as light-weight construction panels, and as coating agents for wood, metal and plastics.

The preferred method to produce organic polymer-polyol-alkali metal silicate emulsion is to mix the polyol and organic acid, then add the alkali metal silicate and organic polymer in a fluid state while agitating between ambient temperature and 100° C. at ambient pressure for 10 to 60 minutes, then to cool the mixture while agitating, thereby producing a stable organic polymer-polyol-alkali metal silicate emulsion.

The components may be mixed in any suitable method, such as simultaneously or by mixing any two components first, then adding the remaining components last, agitating between ambient temperature and 100° C. for 10 to 60 minutes, then cooling while agitating. When an aqueous emulsion of the organic polymer is used, the powdered or granular alkali metal silicate may be mixed with it first.

The components may be mixed in any suitable proportions, the preferred proportions being 1 to 50 parts by weight of an aqueous alkali metal silicate solution or alkali metal silicates which are water-soluble to 25 parts by weight of a polyol and 1 to 100 parts by weight of an organic polymer in a fluid state. Organic acid is added in the amount of 1% to 5% by weight, percentage based on weight of the alkali metal silicate.

The primary object of this invention is to produce stable orgaic polymer-polyol-alkali metal silicate emulsions. Another object is to produce stable organic polymer-polyol-alkali metal silicate emulsions which will react with polyisocyanate compounds is to produce useful polyurethane silicate solid and foamed products.

Other components may be added with the components in the production of organic polymer-polyol-alkali metal silicate emulsion, especially when the emulsion is to be used to produce polyurethane silicate foam. Any suitable amine compound may be added, preferably in an amount up to 10% by weight, percentage based on the weight of Components (a), (b), (c) and (d). Tertiary amines are the preferred amine. Suitable tertiary amines include, but are not limited to, triethylamine, tributylamine, triethylenediamine; N-methyl-morpholine; N,N,N',N'-tetramethylenediamine; triethanolamine; N-methyl-diethanolamine and mixtures thereof.

Up to 1% by weight of organo-metallic compounds may be added with Components (a), (b), (c) and (d), percentage based on the weight of Components (a), (b), (c) and (d), preferably organic-tin compounds such as tin salts of carboxylic acid, e.g., tin acetate, tin octoate, tin ethyl hexoate, tin laurate and the dialkyl tin salts of carboxylic acids, such as dibutyl tin diacetate, dibutyl tin dilaurate, dibutyl-tin maleate or diocyl-tin diacetate.

Up to 20% by weight of a surface-active additive (emulsifiers and foam stabilizers), percentage based on weight of Components (a), (b), (c) and (d), may be added with the Components (a), (b), (c) and (d). Suitable emulsifiers are, e.g., the sodium salts of ricinoleic sulphonates or of fatty acids or salts of fatty acid with amines, e.g., oleic acid diethylamine or stearic acid diethanolamine. Other surface-active additives are: alkali metal or ammonium salts of sulphonic acid, e.g., dodecylbenzene sulphonic acid or dinaphthyl methane disulphonic acid; or fatty acids such as ricinoleic acid, or polymeric fatty acids. The foam stabilizers used are mainly water-soluble polyester siloxanes. These compounds generally have a polydimethylsiloxane group attached to a copolymer of ethylene oxide and propylene oxide. Foam stabilizers of this kind have been described in U.S. Pat. No. 3,629,308.

DESCRIPTION OF PREFERRED EMBODIMENTS

My invention will be illustrated in greater detail in the specific Examples which follow, which detail the preferred embodiments of my process. It should be understood that the scope of my invention is not limited to the specific processes set out in the Examples. Parts and percentages are by weight, unless otherwise indicated.

EXAMPLE 1

Sodium metasilicate pentahydrate is heated to from 70° C. to 80° C. until the sodium metasilicate pentahydrate melts. About equal parts by weight of the melted sodium metasilicate pentahydrate, aqueous emulsion of polystyrene, containing about 40% polystyrene, and polyethylene glycol (mol. wt. 480), containing 5% by weight of adipic acid and 2% by weight of sodium doctyl sulfosuccinate, are thoroughly agitated until the mixture is emulsified, thereby producing a stable organic polymer-polyol-alkali metal silicate emulsion.

About equal parts by weight of the orgaic polymer-polyol-alkali metal silicate emulsion and TDI (tolylene diisocyanate) are thoroughly mixed. The mixture expands to produce a semirigid polyurethane silicate foam which may be cut into panels and used for thermal and sound insulation in buildings, automobiles, airplanes, etc.

EXAMPLE 2

About 50 parts by weight of a polyether triol (hydroxyl no. 56), 3 parts by weight of para-aminobenzoic acid, 2 parts by weight of potassium doctyl sulfosuccinate, 100 parts by weight of an aqueous emulsion containing 40% vinyl chloride and 70 parts by weight of an aqueous sodium silicate solution containing 60% sodium silicate with an $Na_2O:SiO_2$ ratio of about 1:1.75 are mixed, then heated to about 50° C. while vigorously agitating, thereby producing a stable organic polymer-polyol-alkali metal silicate emulsion.

The organic polymer-polyol-alkali metal silicate emulsion may be used to produce flexible foam by mixing 100 parts by weight of the organic polymer-polyol-alkali metal silicate emulsion, 0.25 part by weight of tin oxslate, 0.25 part by weight of triethylenediamine and 50 parts by weight of TDI; the mixture expands to produce a semi-flexible polyurethane silicate foam weighing from 1 to 2 pounds per cubic foot. This foam may be used for padding, packaging, cushions, insulation, etc.

EXAMPLE 3

About 50 parts by weight of an amine sucrose polyol (hydroxyl no. 530) 2 parts by weight of adipic acid, 1 part by weight of benzoic acid, 50 parts by weight of an aqueous emulsion containing 40% methyl methacrylate and 70 parts by weight of sodium metasilicate pentahydrate are mixed, then heated to about 70° C., then agitated for 3 to 10 minutes, thereby producing a stable organic polymer-polyol-alkali metal silicate emulsion.

EXAMPLE 4

About 200 grams of polyethylene glycol (mol. wt. 600), 200 grams of an aqueous solution containing 60% sodium silicate (Na$_2$O:SiO$_2$ ratio of about 1:2) 200 grams by weight of an aqueous emulsion containing about 45% polyvinyl acetate and 4 parts by weight of adipic acid are mixed and heated to about 50° C., then placed into a malt mixing machine and mixed for 1 to 3 minutes, thereby producing a stable organic polymer-polyol-alkali metal silicate emulsion.

EXAMPLE 5

A comprison study was done using the same process and components of Example 1, except that the adipic acid was left out. The mixture emulsified, but within a few hours, the sodium silicate precipitated and formed a firm mass in the bottom of the container and would not re-emulsify with agitation. The organic polymer-polyol-alkali metal silicate emulsion of Example 1 remained stable for several months; very little of the sodium silicate settled to the bottom after a month and was easily emulsified by agitation.

EXAMPLE 6

About equal parts by weight of an aqueous solution, containing 55% by weight of sodium silicate with an Na$_2$O:SiO$_2$ ratio of about 1:1.75, and an aqueous emulsion containing about 40% polyisoprene and a polyol listed below were mixed with about 3% by weight of an organic acid listed below, based on the alkali metal silicate, 2% by weight of sodium doctyl sulfosuccinate, based on reactants, 1% by weight of a silicone surfactant, based on reactants, and 0.5% by weight of triethylenediamine, based on weight of reactants. The mixture was then vigorously agitated at about 50° C. and continued until the mixture cooled to about 30° C., thereby producing a stable organic polymer-polyol-alkali metal silicate emulsion.

| Example | Polyol | Organic acid |
| --- | --- | --- |
| a | Ethylene glycol (mol. wt. 380); | Phthalic acid; |
| b | Ethylene glycol (mol. wt. 600); | Phthalic anhydride; |
| c | Ethylene glycol (mol. wt. 1000) with equal parts of propylene glycol (mol. wt. 600); | Equal parts benzoic acid and adipic acid; |
| d | Propylene glycol (mol. wt. 600); | Para-sminobenzoic acid with equal parts by weight of acetic acid; |
| e | Propylene glycol (mol. wt. 1200); | Equal parts by weight of adipic acid and propionic acid; |
| f | Castor oil; | Acetic acid; |
| g | Ethylene polyether triol (hydroxyl No. 56); | Isophthalic acid and fumaric acid; |
| h | Ethylene polyether diol (hydroxyl No. 112); | Maleic anhydride; |
| i | Ethylene polyether diol (hydroxyl No. 56); | Oleic acid; |
| j | Amine sucrose polyether polyol (hydroxyl No. 350); | Equal parts by weight of tetrachlorophthalic acid anhydride and fumaric acid; |
| k | Polyester resin (0.5 mol of adipic acid and 4 mols of glycerol); | Equal parts by weight of acetic acid and azelaic acid; |
| l | Glycerol; | Glutaric acid anhydride; |
| m | Equal parts by weight of ethylene glycol (mol. wt. 380) and starch; | Equal parts by weight of adipic acid and glycolic acid; |
| n | 5 parts by weight of ethylene glycol (mol. wt. 600) and 1 part by weight of resorcinol; | Hydroxycaproic acid and equal parts by weight of para-aminobenzoic acid; |
| o | Equal parts by weight of polypropylene diol (mol. wt. 600) and cellulose powder; | Equal parts by weight of adipic acid and propionic acid; |
| p | Liquid formaldehyde phenol resin with free hydroxyl group and equal parts by weight of trichlorobutylene oxide; | Equal parts by weight of malic acid and phthalic acid anhydride; |
| q | Ethylene-propylene polyether diol (hydroxyl No. 33.5). | Adipic acid. |

EXAMPLE 7

About equal parts by weight of polypropylene glycol (mol. wt. 1000) and an aqueous emulsion containing about 40% polystyrene are thoroughly mixed, then 2% by weight of adipic acid and 15% by weight of powdered hydrated sodium silicate (SiO$_2$:Na$_2$O is 2:1), percentage based on weight of the polyol and aqueous emulsion of polystyrene, are slowly added while agitating at ambient temperature and pressure, thereby producing an organic polymer-polyol-alkali metal silicate emulsion.

EXAMPLE 8

About 50 parts by weight of an aqueous suspension or emulsion of one of the organic polymers listed below, 25 parts by weight of polyethylene triol (mol. wt. 1000, hydroxyl no. 56), 1 part by weight of adipic acid and 50 parts by weight of an aqueous sodium silicate solution, containing 55% solids (SiO$_2$:Na$_2$O of 2:1), are thoroughly mixed at about 50° C., thereby producing a stable organic polymer-polyol-sodium silicate emulsion.

| Example | Aqueous emulsion or suspension of an organic polymer |
| --- | --- |
| a | 40% by weight of polystyrene; |
| b | 35% by weight of methyl methacrylate; |
| c | 50% by weight of poly(sodium methacrylate); |
| d | 45% by weight of poly(sodium acrylate); |
| e | 50% by weight of poly(vinylidene chloride); |
| f | 40% by weight of polyisoprene; |
| g | 45% by weight of polychloroprene; |
| h | 40% by weight of poly(butadeine-acrylonitrile) copolymer; |
| i | 45% by weight of poly(butadeine-styrene)copolymer; |
| j | 40% by weight of poly(vinyl chloride) polymer; |
| k | 50% by weight of poly(vinyl pyrrolidone) polymer; |
| l | 45% by weight of polyvinyl acetate polymer; |
| m | 50% by weight of poly(vinyl formal)polymer; |
| n | 35% by weight of poly(vinyl chloride-vinyl acetate) copolymer. |

Although specific conditions and ingredients have been described in conjunction with the above Examples of preferred embodiments, these may be varied and other reagents and additives may be used, where suitable, as described above, with similar results.

Other modifications and applications of this invention will occur to those skilled in the art, upon reading this disclosure. These are intended to be included within the scope of this invention as defined in the appended claims.

I claim:

1. The process for the production of a stable organic-polymer-polyol-alkali metal silicate emulsion by mixing the following components:
   (a) Aqueous alkali metal silicate solution, 1 to 50 parts by weight;
   (b) Polyol, 25 parts by weight;
   (c) Organic acid, 1% to 5% by weight, percentage based on weight of alkali metal silicate solution;
   (d) An organic polymer in a fluid state.

2. The process of claim 1 wherein the alkali metal silicate is selected from the group consisting of sodium silicate, potassium silicate, lithium silicate and mixtures thereof.

3. The process of claim 1 wherein the polyol is selected from the group consisting of polyhydric alcohol, polyesters, polyethers, polythioethers, polyacetals, polycarbonates, polyester amides containing at least 2 hydroxy groups, and mixtures thereof.

4. The process of claim 1 wherein the organic acid is selected from the group consisting of aliphatic carboxylic acid, aliphatic polycarboxylic acid, cycloaliphatic carboxylic acid, cycloaliphatic polycarboxylic acid, aromatic carboxylic acid, aromatic polycarboxylic acid, heterocyclic polycarboxylic acid, aliphatic carboxylic acid anhydrides, aromatic carboxylic acid anhydrides and mixtures thereof.

5. The process of claim 1 wherein the organic acid is adipic acid.

6. The product produced by the process of claim 1.

7. The process of claim 1 wherein an amine compound in the amount of up to 10% is added with Components (a), (b), (c) and (d).

8. The process of claim 7 wherein the amine compound is a tertiary amine.

9. The process of claim 1 wherein up to 20% by weight of an emulsifying agent is added to the Components (a), (b), (c) and (d), percentage based on weight of Components (a), (b), (c) and (d).

10. The process of claim 1 wherein up to 20% by weight of a foam stabilizer, percentage based on Components (a), (b), (c) and (d), is added with Components (a), (b), (c) and (d).

11. The process of claim 1 wherein the organic polymer is an aqueous emulsion or suspension of an organic polymer, selected from the group consisting of polymerized vinyl monomers, polymerized mixtures of vinyl monomers, polymerized organic dienes, polymerized mixtures of vinyl monomers and organic dienes, polymerized allyl compounds, polymerized mixtures of allyl compounds and vinyl monomers, polymerized unsaturated fluorocarbon compounds and polymerized mixtures of unsaturated fluorocarbon compounds and vinyl monomers and mixtures thereof.

12. The process of claim 1 wherein the organic polymer is an aqueous emulsion or suspension of polystyrene.

13. The process of claim 1 wherein the water-soluble alkali metal silicate powder or granules are used in place of the aqueous alkali metal silicate solution.

* * * * *